Oct. 12, 1937.                M. STEENBECK                2,095,772
DISCHARGE DEVICE CONTROL
Filed May 4, 1934
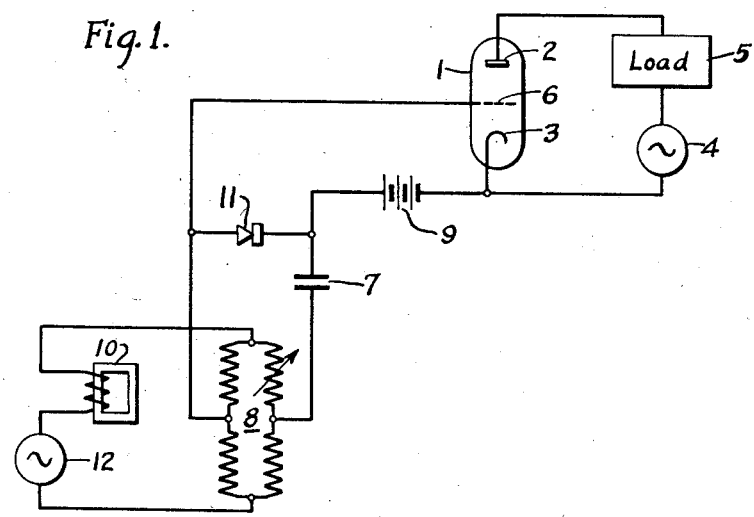
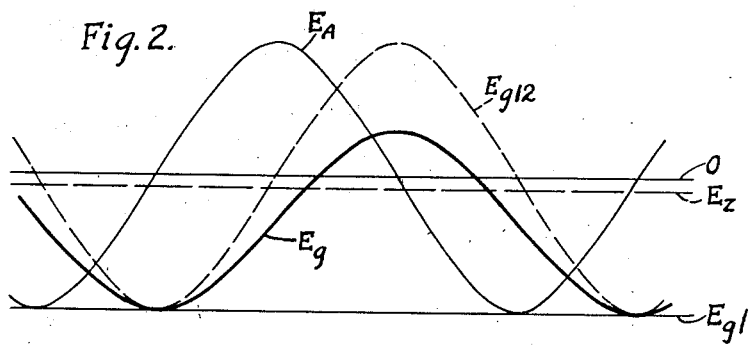
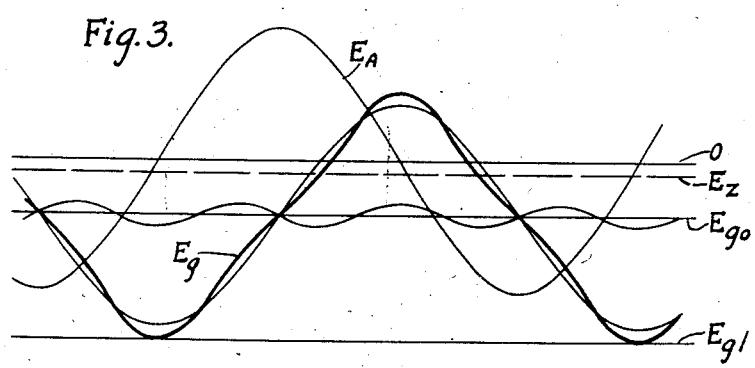
WITNESSES:
INVENTOR
Max Steenbeck
BY
ATTORNEY Patented Oct. 12, 1937

2,095,772

UNITED STATES PATENT OFFICE 2,095,772

DISCHARGE DEVICE CONTROL

Max Steenbeck, Berlin-Siemensstadt, Germany, assignor to Westinghouse Electric & Manufacturing Company, East Pittsburgh, Pa., a corporation of Pennsylvania Application May 4, 1934, Serial No. 723,923
In Germany May 5, 1933

6 Claims. (Cl. 250—27)

This invention relates to control of electric gas or vapor filled discharge devices and especially to a circuit in which alternating current voltage is used to control the discharge device.

An object of the invention is to vary the value of alternating current voltage applied to the control grid circuit of the discharge device and vary the time for initiating the discharge.

This present application constitutes a simplification and improvement of the methods described in the copending application of R. G. Berthold et al., Serial No. 651,712, filed January 14, 1933, Patent No. 2,020,930, Nov. 12, 1935, for control of electric vacuum discharge tubes. In this application methods were described for the control of electric circuits by means of grid controlled ion discharge devices in which the time for initiating the discharge is made variable by applying to the control grids a voltage with variable steepness of the wave front. These methods have the result that the value of the grid voltage necessary to ignite the device can be obtained at any desired time within the working half period of the anode voltage. The situation occurs frequently, however, in the control of electric circuits that the determining quantity is constituted by an alternating current voltage and the present invention deals especially with such a circuit in which it is possible to obtain directly a control quantity for the discharge device by varying the value of this alternating current voltage.

The present invention represents an advantageous method of using this alternating current voltage for the control of the discharge device. The voltage curve of a rectifier energized by this alternating current voltage has a constant phase position relative to the alternating current anode voltage of the discharge device and this voltage also serves to charge a condenser having a small inherent loss. A constant direct current voltage serving as the initial grid voltage can be provided in series with this control voltage on the rectifier if desired. The regulation of the time of ignition is effected by varying the amplitude of the alternating current voltage derived from the control circuit and such variation in amplitude can be provided by means such as a Wheatstone bridge.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawing, in which Figure 1 is a diagrammatic view of a system of control organized in accordance with the present invention, Fig. 2 is a diagram illustrating the voltage curves of the circuit and electrodes, and Fig. 3 is a diagram of the curves of Fig. 2 with a harmonic wave applied to the grid control circuit.

Fig. 1 discloses a system embodying the invention and having a discharge device 1 having therein the two main electrodes, namely, the anode 2 and the cathode 3 surrounded by a gas or vapor. This gas may be any one of the suitable noble gases or mercury vapor. These two main electrodes are connected to an output circuit, preferably containing an alternating current source or circuit 4 and a load or energy translating device 5 which is to be energized by direct current of variable amount from the anode lead. The discharge device 1 also contains the control grid 6 and the invention especially concerns the control circuit applied between this control grid and one of the main electrodes such as the cathode 3.

A condenser 7 having a small internal loss is used in the circuit and is preferably initially charged negative relative to the cathode by a direct current source 9. The control voltage originates from an alterating current source 12. Between the alterating source 12 and the connections to the grid and cathode is a control 8 by which the amplitude of the voltage of the alternating current source 12 can be varied. This control is preferably in the form of a Wheatstone bridge having one of its legs variable as illustrated. Across the connections between the control Wheatstone bridge 8 and the electrodes of the device is a rectifier 11. The rectifier 11 is traversed by the negative half wave of the alternating current voltage and this energizes the condenser 7. The voltage curve of the rectifier 11 is impressed upon the control grid 6 of the discharge device.

The operation of this system is shown in the diagram of Fig. 2 in which $E_A$ indicates an alternating current voltage applied to one of the main electrodes of the discharge device 1. $E_z$ is the value of the grid voltage above which the discharge in the device 1 will occur. This is generally called the ignition voltage line. $E_g 1$ is the negative initial voltage impressed on the grid and $E_g$ is the actual grid voltage curve while the dotted line $E_g12$ represents the voltage curve of the source 12.

An alternating current voltage is derived from the circuit of the Wheatstone bridge 8 which is so adjusted that the phase of the alternating current voltage of the device 8 lags behind the energizing alternating current voltage source 4 of the device 1 by about 90 electrical degrees. This makes possible the control of the system over the whole range of 180 electrical degrees, that is, through one-half wave of the energizing voltage. The direct current voltage source 9 applies a charge to the upper terminal of condenser 7 which is negative relatively to the cathode. The lower terminal of the condenser simultaneously receives a further positive charge during the time of a negative half wave of the alternating current voltage derived from the Wheatstone bridge circuit. During the time of the positive half wave of the alternating current voltage of the circuit 8, the potential of the grid 6 becomes so large that the grid voltage curve intersects the ignition line $E_z$ and causes a discharge in the device 1. The displacement or variation of the instantaneous time of ignition is obtained by varying the amplitude of the alternating current voltage of control circuit 8 as by means of the adjustable leg of the bridge. The steepness of the grid voltage is varied in accordance with the amplitude of the alternating current voltage so that the ignition line is intercepted sooner or later and thus a control of the direct current output of the device 1 is obtained.

At certain voltage values supplied to the grid or at certain amplitudes of the alternating current control voltage, the grid voltage curve will cross the ignition line very slowly. This slow crossing of the ignition line may in some circumstances reduce the exactness of the control or its sensitivity because the ignition of the device depends not only upon the value impressed on the grid but also upon the vapor density varying with the load and the variation of the voltage value caused thereby. The circuit disclosed in Fig. 1 is also adapted to obtain a quick crossing of the grid voltage curve over the ignition value by having a harmonic preferably the third harmonic superimposed on the alternating control voltage. To obtain this result, there is connected in the system of Fig. 1 a saturated iron core reactor 10 whose saturization can be varied. Fig. 3 discloses the result on the voltage curves of Fig. 2 by having a harmonic such as the third harmonic $E_{g0}$ applied to the control circuit. This Fig. 3 shows that the intersection of the grid voltage curves with the ignition value line can be so adjusted in accordance with the direct current initial voltage that ignition will occur at a part of the grid voltage curve which is relatively steep.

Although I have shown and described a certain specific embodiment of the invention, it is apparent that many modifications thereof are possible. The invention, therefore, is not to be restricted except insofar as is necessitated by the prior art and by the spirit of the appended claims.

I claim as my invention:

1. An electric discharge device having two main electrodes and a grid, a rectifier and a capacitor in series relation, means for applying an alternating voltage to charge said capacitor through said rectifier, means for varying the amplitude of said alternating current voltage at will and means for connecting said capacitor and said alternating voltage in series relation with each other between said grid and one of said main electrodes.

2. An electric discharge device having two main electrodes and a grid, a control circuit comprising a Wheatstone bridge, one of the legs of said bridge being variable at will, connections for applying alternating current across one diagonal of said bridge a rectifier and a capacitor in series across the other diagonal of said bridge and means for connecting said grid and one main electrode in shunt to said rectifier.

3. An electric discharge device having two main electrodes and a grid, a control circuit therefor comprising connections to said grid and one of said main electrodes, a source of alternating voltage, means for charging a capacitor through a rectifier from said source, means for causing said source to produce an alternating voltage differing from that of said source by a harmonic means for varying at will the amplitude of said alternating current voltage and means for including the last-named alternating voltage and said capacitor in series relation across said connections.

4. An electric discharge device having two main electrodes and a grid, a control circuit therefor comprising connections to said grid and one of said main electrodes, a rectifier across said connections, means for applying an alternating current to said connections and means for varying the amplitude of said alternating current voltage and a saturated iron core in said alternating current connections.

5. An electric discharge device having two main electrodes and a grid, a rectifier and a capacitor in series relation, means for applying an alternating voltage to charge said capacitor through said rectifier, means for varying the amplitude of said alternating current voltage at will and means for connecting a constant voltage source, said capacitor and said alternating voltage in series relation with each other between said grid and one of said main electrodes.

6. An electric discharge device having two main electrodes and a grid, a control circuit therefor prising connections to said grid and one of said main electrodes, a source of alternating voltage, means for charging a capacitor through a rectifier from said source, means for causing said source to produce an alternating voltage differing from that of said source by a harmonic, means for varying at will the amplitude of said alternating current voltage and means for including the last-named alternating voltage, said capacitor and a constant voltage source in series relation across said connections.

MAX STEENBECK.